United States Patent
Akavaram et al.

(10) Patent No.: US 9,704,401 B2
(45) Date of Patent: Jul. 11, 2017

(54) INTELLIGENT PARKING SPACE IDENTIFICATION AND NOTIFICATION

(71) Applicant: International Business Machines Corporation, Armonk, NY (US)

(72) Inventors: Vikrant Akavaram, Foster City, CA (US); Lisa M. Bradley, Cary, NC (US); Lillian Y. Lei, Moss Beach, CA (US); Lawrence Louie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 14/521,047

(22) Filed: Oct. 22, 2014

(65) Prior Publication Data

US 2016/0117925 A1    Apr. 28, 2016

(51) Int. Cl.
   *G08G 1/14*    (2006.01)
   *B60W 40/09*    (2012.01)

(52) U.S. Cl.
   CPC ............ *G08G 1/143* (2013.01); *B60W 40/09* (2013.01); *G08G 1/144* (2013.01); *G08G 1/146* (2013.01)

(58) Field of Classification Search
   CPC . E04H 6/42; G08G 1/14; G08G 1/141; G08G 1/143; G08G 1/144; G08G 1/145; G08G 1/146; G08G 1/147; G08G 1/148; G08G 1/162; G08G 1/168; G07B 15/02; B62D 15/028
   USPC ...................................................... 340/932.2
   See application file for complete search history.

(56) References Cited

U.S. PATENT DOCUMENTS

| | | |
|---|---|---|
| 6,970,101 B1 | 11/2005 | Squire et al. |
| 8,692,688 B1 | 4/2014 | Tuxen |
| 2008/0033769 A1 | 2/2008 | Koorapati |
| 2008/0231469 A1* | 9/2008 | Knoll ................. B60Q 9/006 340/932.2 |
| 2010/0332080 A1* | 12/2010 | Bae ................. B62D 15/028 701/42 |
| 2013/0249711 A1 | 9/2013 | Vellore Sripathi Rao |

(Continued)

FOREIGN PATENT DOCUMENTS

| | | |
|---|---|---|
| EP | 2309472 | 5/2014 |
| WO | 2012142603 | 10/2012 |
| WO | 2013006549 | 1/2013 |

OTHER PUBLICATIONS

Akavaram et qal., "Intelligent Parking Space Identification and Notification," U.S. Appl. No. 14/833,057, filed Aug. 22, 2015, 36 pages.

(Continued)

*Primary Examiner* — Laura Nguyen
(74) *Attorney, Agent, or Firm* — VanLeeuwen & VanLeeuwen; David Zwick

(57) ABSTRACT

An approach is provided in which an intelligent parking system receives a request from a driver of a vehicle for a parking space. The intelligent parking system identifies available parking spaces and selects a preferred parking space from the available parking spaces based upon comparing dynamic parking space properties corresponding to the available parking spaces to factors such as driver skill data corresponding to the driver or vehicle properties corresponding to the vehicle. In turn, the intelligent parking system notifies the driver of the preferred parking space.

7 Claims, 9 Drawing Sheets

(56) References Cited

U.S. PATENT DOCUMENTS

| | | | |
|---|---|---|---|
| 2014/0015974 A1 | 1/2014 | Nagy | |
| 2015/0066545 A1* | 3/2015 | Kotecha | G06Q 10/02 705/5 |
| 2015/0279213 A1* | 10/2015 | Balter | G08G 1/144 705/13 |
| 2015/0310744 A1* | 10/2015 | Farrelly | G06Q 10/063114 340/932.2 |
| 2015/0371541 A1* | 12/2015 | Korman | G08G 1/147 340/932.2 |

OTHER PUBLICATIONS

"List of IBM Patents or Patent Applications Treated as Related," Letter from Leslie A. Van Leeuwen, Aug. 22, 2015, 1 page.

Grabianowski, "How Self-parking Cars Work," HowStuffWorks, Aug. 2006, 3 pages.

* cited by examiner

INTELLIGENT PARKING SPACE IDENTIFICATION AND NOTIFICATION

BACKGROUND

The present disclosure relates to dynamically locating a preferred parking space for a driver of a vehicle based upon driver skill data and dynamic parking space properties of available parking spaces.

Locating an available parking space to park a vehicle is a tedious task, especially while driving an oversized vehicle or in a location during business hours with limited parking spaces. Some parking spaces are inherently difficult to park a vehicle due to various physical properties such as a parking space's size, nearby hazards such as a light pole, or the type of parking space such as one that requires parallel parking maneuvers. In addition to a parking space's various physical properties, a driver's skill level contributes to the success or failure of parking the vehicle without damage to the vehicle or surrounding objects, such as other vehicles. For example, a new driver may not have the skills necessary to park a vehicle in a tight parking space with surrounding obstacles, while a more experienced driver may have the expertise to successfully maneuver the vehicle into the parking spot.

BRIEF SUMMARY

According to one embodiment of the present disclosure, an approach is provided in which an intelligent parking system receives a request from a driver of a vehicle for a parking space. The intelligent parking system identifies available parking spaces and selects a preferred parking space from the available parking spaces based upon comparing dynamic parking space properties corresponding to the available parking spaces to factors such as driver skill data corresponding to the driver or vehicle properties corresponding to the vehicle. In turn, the intelligent parking system notifies the driver of the preferred parking space.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
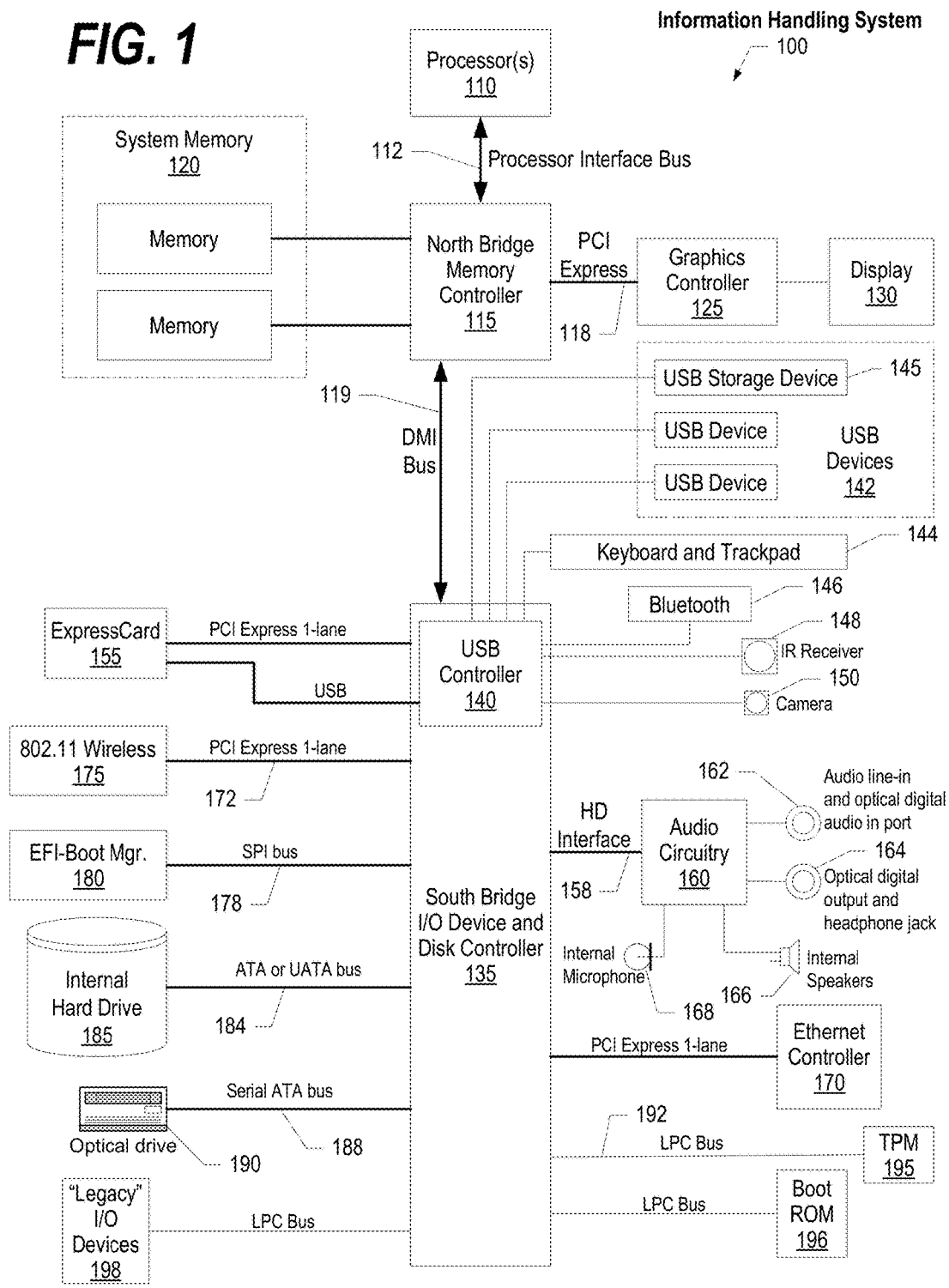
FIG. 1 is a block diagram of a data processing system in which the methods described herein can be implemented.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the driver's computer, partly on the driver's computer, as a stand-alone software package, partly on the driver's computer and partly on a remote computer or entirely on the remote computer or server. In the latter scenario, the remote computer may be connected to the driver's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The following detailed description will generally follow the summary of the disclosure, as set forth above, further explaining and expanding the definitions of the various aspects and embodiments of the disclosure as necessary.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

Figure 2:
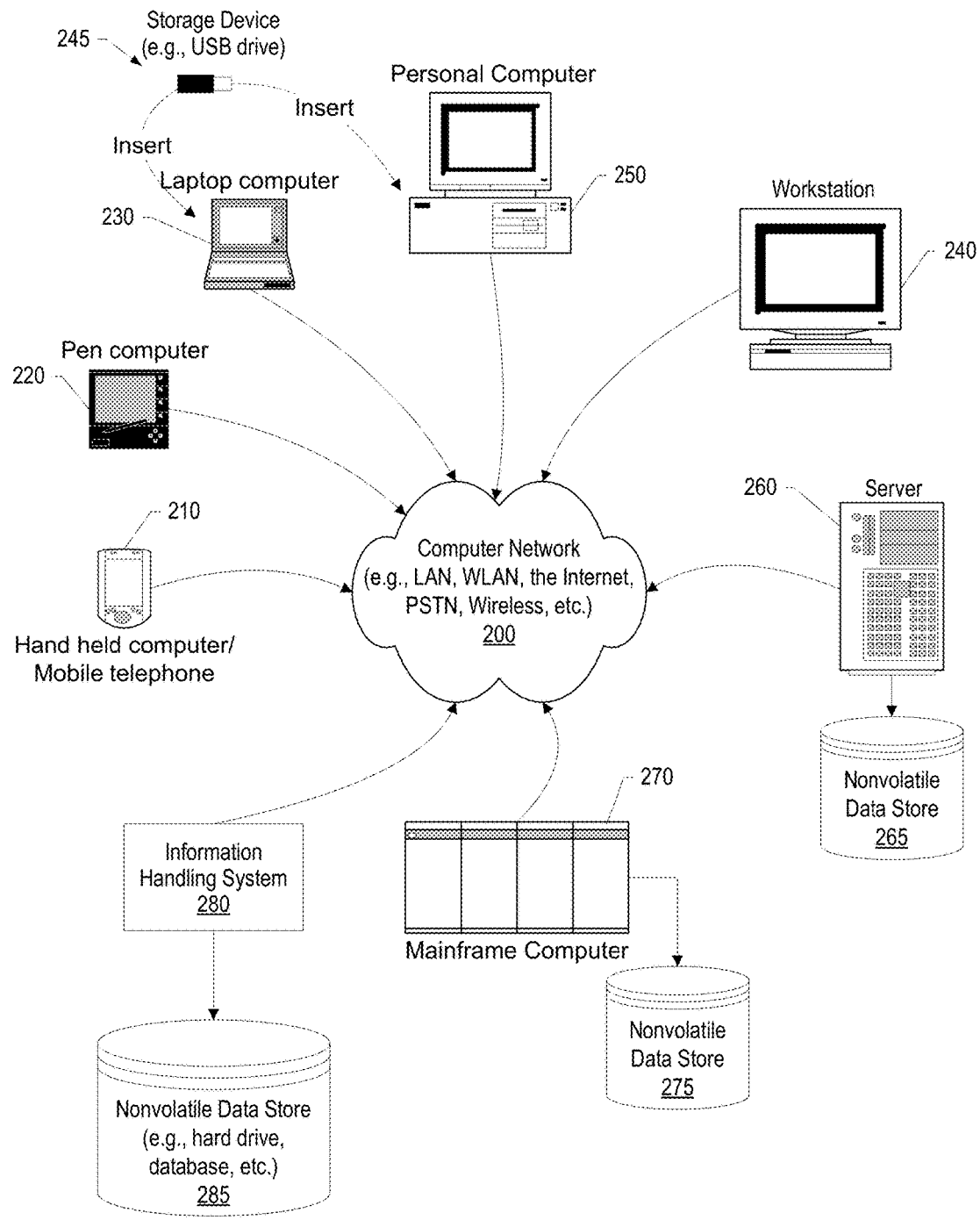
FIG. 2 provides an extension of the information handling system environment shown in FIG. 1 to illustrate that the methods described herein can be performed on a wide variety of information handling systems which operate in a networked environment.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
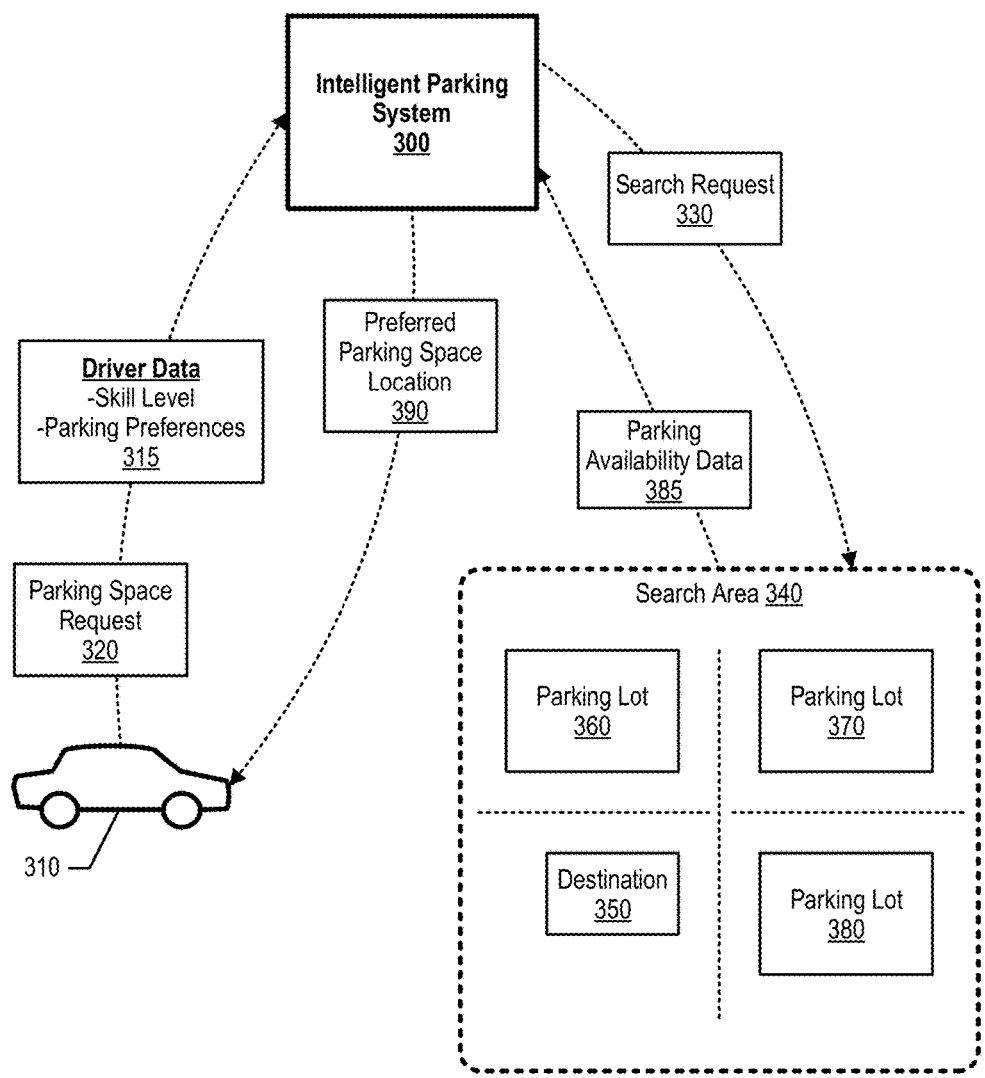
FIG. 3 is an exemplary diagram depicting an intelligent parking system that provides a preferred parking space location to a driver based upon parking space properties and driver data.

FIG. 3 is an exemplary diagram depicting an intelligent parking system that provides a preferred parking space location to a driver based upon dynamic parking space properties and driver skill data. As discussed in more detail below, intelligent parking system 300 matches driver data, which includes a driver skill level and parking preferences, to parking availability data received from mobile devices and provides a preferred parking space location to the driver accordingly. Although the term "driver" is utilized in this disclosure, a passenger or user external to vehicle 300 may also provide driver information and receive parking space information to assist the driver of a vehicle.

Intelligent parking system 300 receives driver data 315 from a driver of vehicle 310 and stores driver data 315 in a local storage area. Driver data 315 may be sent from the driver's computing device (e.g., smartphone, laptop, etc.), or driver data 315 may be sent from vehicle 310's onboard system. In one embodiment, the onboard system may provide a driver interface to the driver for the driver to enter information. In another embodiment, the onboard system may synchronize with the driver's computing device, which may be an advantageous embodiment if the driver drives multiple vehicles. In yet another embodiment, driver data 310 may include vehicle properties of vehicle 310, such as vehicle 310's dimensions and turning radius.

When the driver requires a parking space for a target destination, the driver initiates parking space request 320 to intelligent parking system 300. In one embodiment, the driver manually initiates parking space request 320, such as by selecting a button on the driver's computing device (see FIG. 8 and corresponding text for further details). In another embodiment, the driver's computing device automatically initiates parking space request 320 when the driver enters a target destination. For example, the driver's device may be configured to automatically request a parking space when the driver's target destination is within a ten mile radius of the center of town. In yet another embodiment, intelligent parking system 300 may initiate communication with the driver's device, such as when the driver pulls up to a parking garage and intelligent parking system 300 requires driver data 315 in order to notify the driver of a preferred parking spot in the parking garage.

When intelligent parking system 300 receives parking space request 320, intelligent parking system 300 identifies an area for which to search for an available parking space (search area 340) based upon the drivers target destination and, in one embodiment, a parking distance threshold included in driver data 315. The parking distance threshold indicates a maximum distance that the driver is willing to park away from the target destination (e.g., 500 ft.).

In turn, intelligent parking system 300 sends parking space search request 330 to mobile devices included in search area 340. The mobile devices may be installed on vehicles driving within search area 340, or mobile devices carried or worn by pedestrians within search area 340 (see FIG. 4 and corresponding text for further details). The example in FIG. 3 shows that search area 340 includes the drivers target destination 350, parking lots 360, 370, 380, and possible street side parking along the roads. Intelligent parking system 300 sends search request 330 to mobile devices within search area 340 to capture parking availability data.

The mobile devices, in turn, provide real-time parking availability data 385 to intelligent parking system 300. Parking availability data 385, in one embodiment, includes available parking space locations and parking space properties, such as the parking space dimensions, cost of parking, street light proximity, or other environmental characteristics of the parking space. In another embodiment, parking availability data 385 includes raw data collected by the mobile devices such as images or distance data for determining parking space sizes. In this embodiment, intelligent parking system 300 uses the raw data go generate parking space properties such as the parking space dimensions and whether objects exist in close proximity to the available parking spaces (poles, vehicles, etc.). In one embodiment, mobile devices are continuously collecting parking availability data and providing parking availability data 385 to intelligent parking system 300. In this embodiment, intelligent parking system 300 analyzes the already received parking availability to respond to parking space request 320.

Intelligent parking system 300 compares parking availability data 385 with driver data 315 to determine a preferred parking space for the driver. For example, if the driver prefers an angled parking space, intelligent parking system 300 applies a higher weighting to angled parking spaces. In another example, the driver may be driving a large vehicle and require additional space to maneuver the vehicle into the parking space. In this example, intelligent parking system 300 applies a higher weighting to parking spaces that have small vehicles, or no vehicles, in the adjacent parking spots. In addition, intelligent parking system 300 considers the skill level of the driver (included in driver data 315). For example, if the driver is a highly skilled driver, intelligent parking system 300 may place a higher weighting over a "tight fitting" parking space close to the target destination over a larger parking space that is further from the target destination.

Once intelligent parking system 300 ranks the available parking spaces, intelligent parking system 300 selects a preferred parking space and sends preferred parking space location 390 to the driver. In one embodiment, the driver's computing device, or onboard system, changes the target destination to the preferred parking space location. This allows the driver to drive directly to the preferred parking space and walk to the target destination. After the driver occupies the preferred parking spot, the driver's device, in one embodiment, sends a notification to intelligent parking system 300 that the space is now occupied. If the driver decides not to park in the preferred parking spot, the driver's device may send a notification to intelligent parking system 300 that the space is still available for other drivers.

In one embodiment, intelligent parking system 300 may send vehicle 310's driver multiple available parking spaces for the driver's system to select a preferred parking space from the multiple parking spaces. In another embodiment, intelligent parking system 300 sends a preferred space location to vehicle 310's driver and does not send the preferred space location to other drivers unless vehicle 310's driver does not utilize the preferred parking space. In yet another embodiment, if the preferred spot is taken prior to vehicle 310's driver arriving, intelligent parking system 300 sends a next best preferred space location to vehicle 310's driver.

Figure 4:
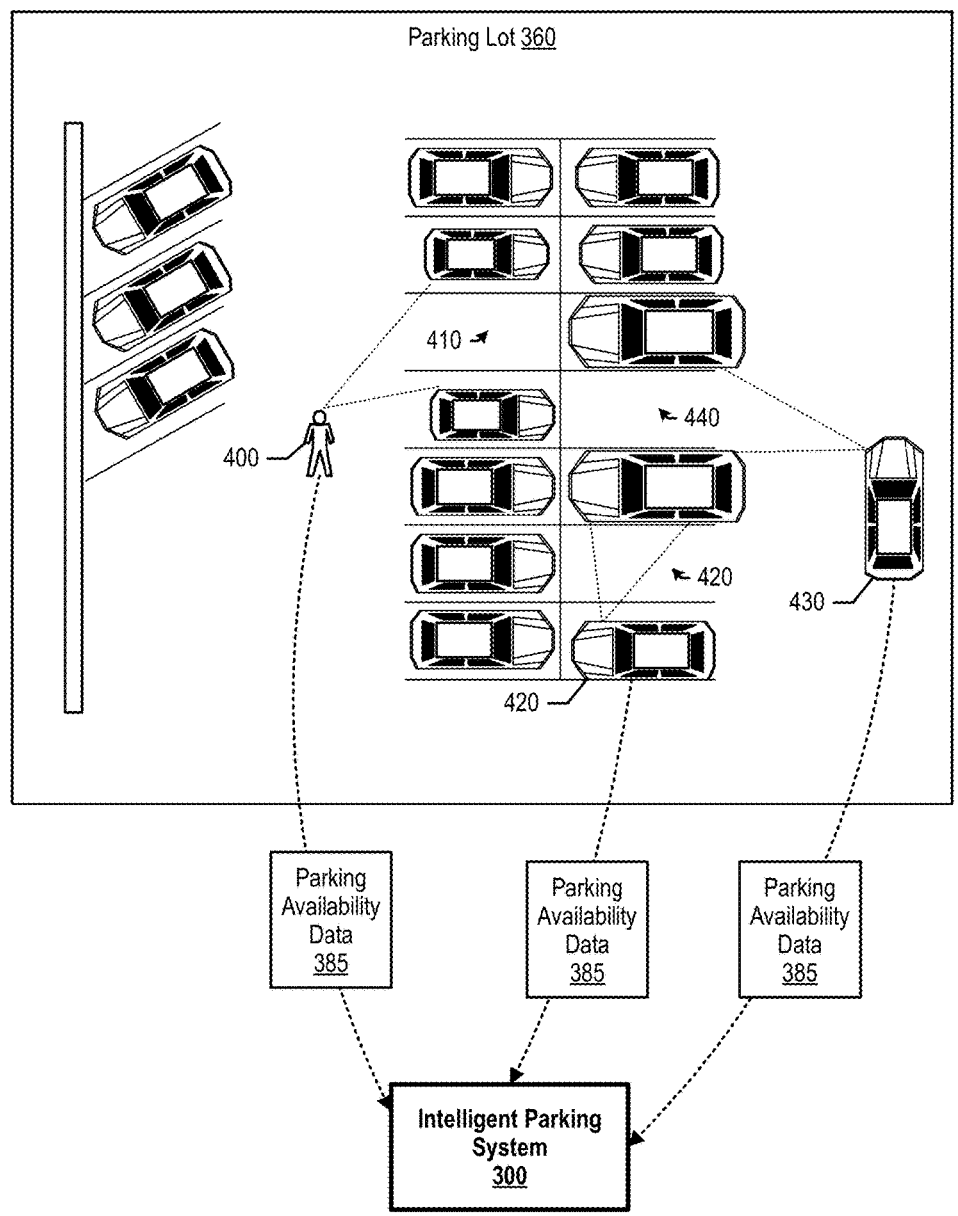
FIG. 4 is an exemplary diagram depicting an intelligent parking system receiving parking availability data from mobile devices.

FIG. 4 is an exemplary diagram depicting an intelligent parking system receiving parking availability data from mobile devices. FIG. 4 depicts various mobile devices capturing parking availability data within parking lot 360. In one embodiment, the mobile devices also capture parking availability data along streets or other non-structured areas due to the mobile nature and dynamic capturing capabilities of the mobile devices (e.g., image capture, distance detection through sonar technologies, etc.).

FIG. 4 shows three available parking spaces 410, 420, and 440, which are detected by three different mobile devices. Although each of parking spaces 410, 420, and 440 are designated to be the same size, the additional area adjacent to the parking spaces is different due to the size of the vehicles parked in the adjacent parking spaces. For example, parking space 410 is adjacent to two compact vehicles, which provides an ample amount of additional area for a driver to park a vehicle, especially when compared to parking space 440 that is adjacent to two large vehicles.

The mobile device corresponding to pedestrian 400 may be a wearable mobile device, a handheld device, or other computing device capable of capturing parking available data 385. As pedestrian 400 nears parking space 410, the mobile device captures information pertaining to parking space 410. For example, the mobile device may use video capturing technology to take pictures of the available space and compute the size of parking space 410 using geometric algorithm techniques. As can be seen, vehicles adjacent to parking space 410 are compact, which increases the additional area for a driver to maneuver a vehicle into parking space 410. For example, if a driver is driving a truck with poor turning radius, the driver's parking preference may include a preference of two extra feet of additional area adjacent to an available parking space.

In turn, pedestrian 400's mobile device provides parking availability data 385 to intelligent parking system 300 that includes the parking space properties of parking space 410, which may include a location, dimensions, and environment data such as proximate street lights, fire hydrants, vehicles, etc. Likewise, vehicle 420 is parked and includes sensors that determine availability of parking space 420 such as by using sonar capability or video capability. In turn, vehicle 420's onboard system provides parking availability data 385 to intelligent parking system 300 (see FIG. 9 and corresponding text for further details).

Vehicle 430 is traveling on an aisle and its onboard mobile device detects parking space 440 is available. As can be seen, vehicles adjacent to parking space 440 are large, which reduces the additional area for a driver to maneuver a vehicle into parking space 440. Vehicle 430's mobile device, in turn computes an area of parking space 440 and sends availability data 385 to intelligent parking system 300. In one embodiment, vehicle 430 may have just pulled out of parking space 440 and notifies intelligent parking system 300 of the new availability of parking space 440.

Figure 5:
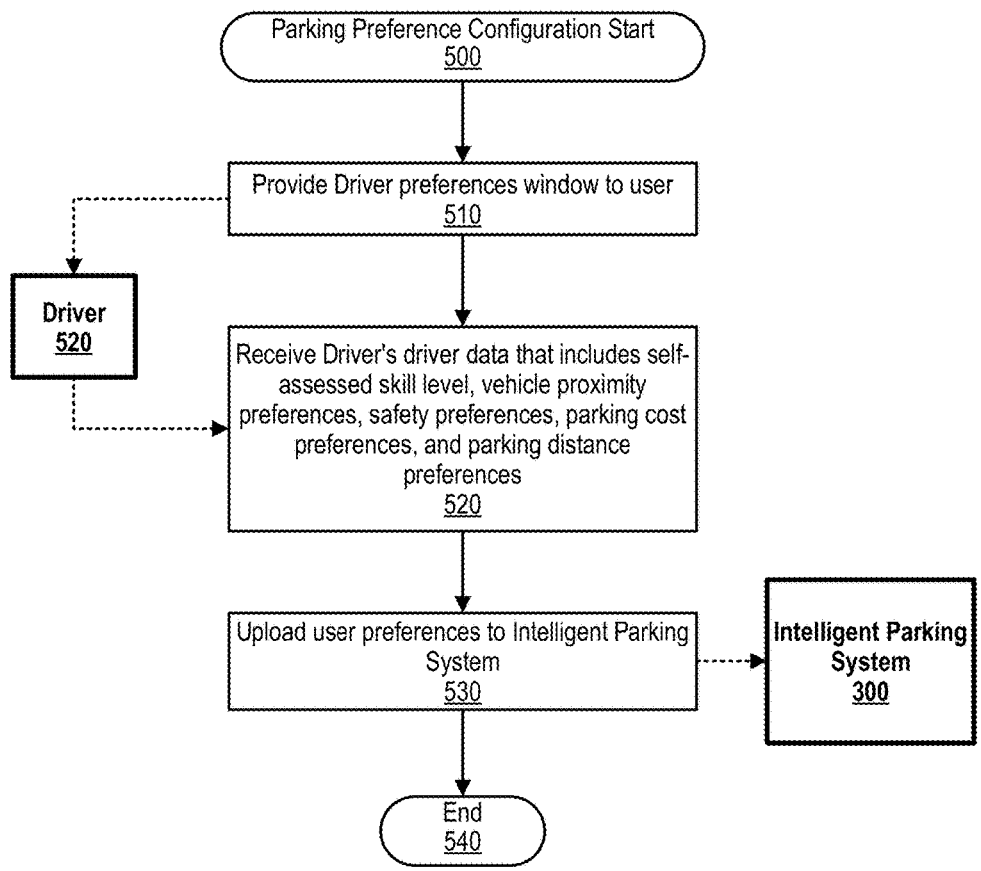
FIG. 5 is an exemplary flowchart depicting steps by a driver device to capture driver data from a driver (driver) and provide the driver data to an intelligent parking system.

FIG. 5 is an exemplary flowchart depicting steps by a driver device to capture driver data from a driver (driver) and provide the driver data to an intelligent parking system.

Processing commences at 300, whereupon the process provides driver 520 with a driver data input window at step 510. At step 520, the process receives the driver's driver data, which includes driver data such as:
Driver Skill Level: Above Average
Parking Preferences:
Parking Distance Threshold: Within 500 Feet Of Target Destination
Parking Cost Preferences: Under $3 Per Hour
Safety Preferences: Within 30 Feet Of Street Light
Additional Area Preference: Adjacent To Mid-Size Cars And Smaller
Parking Space Type Preference: Angled Parking
Vehicle Properties:
Vehicle Dimensions: 8 ft W×16 ft L×6.5 ft H
Turning Radius: 24 ft.

Figure 6:
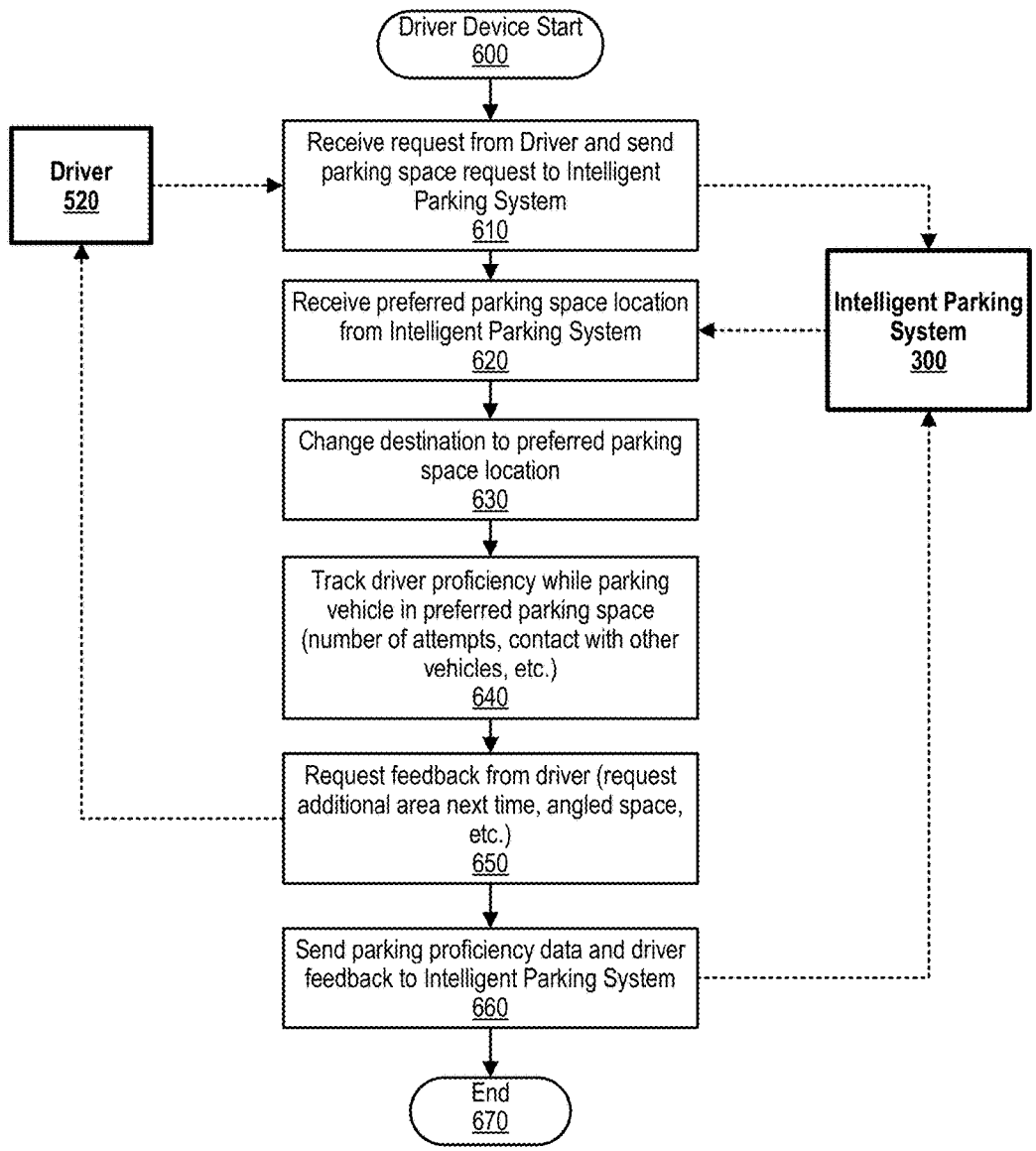
FIG. 6 is an exemplary flowchart depicting steps taken by a driver device to receive available parking space information from intelligent parking system 300.
Figure 7:
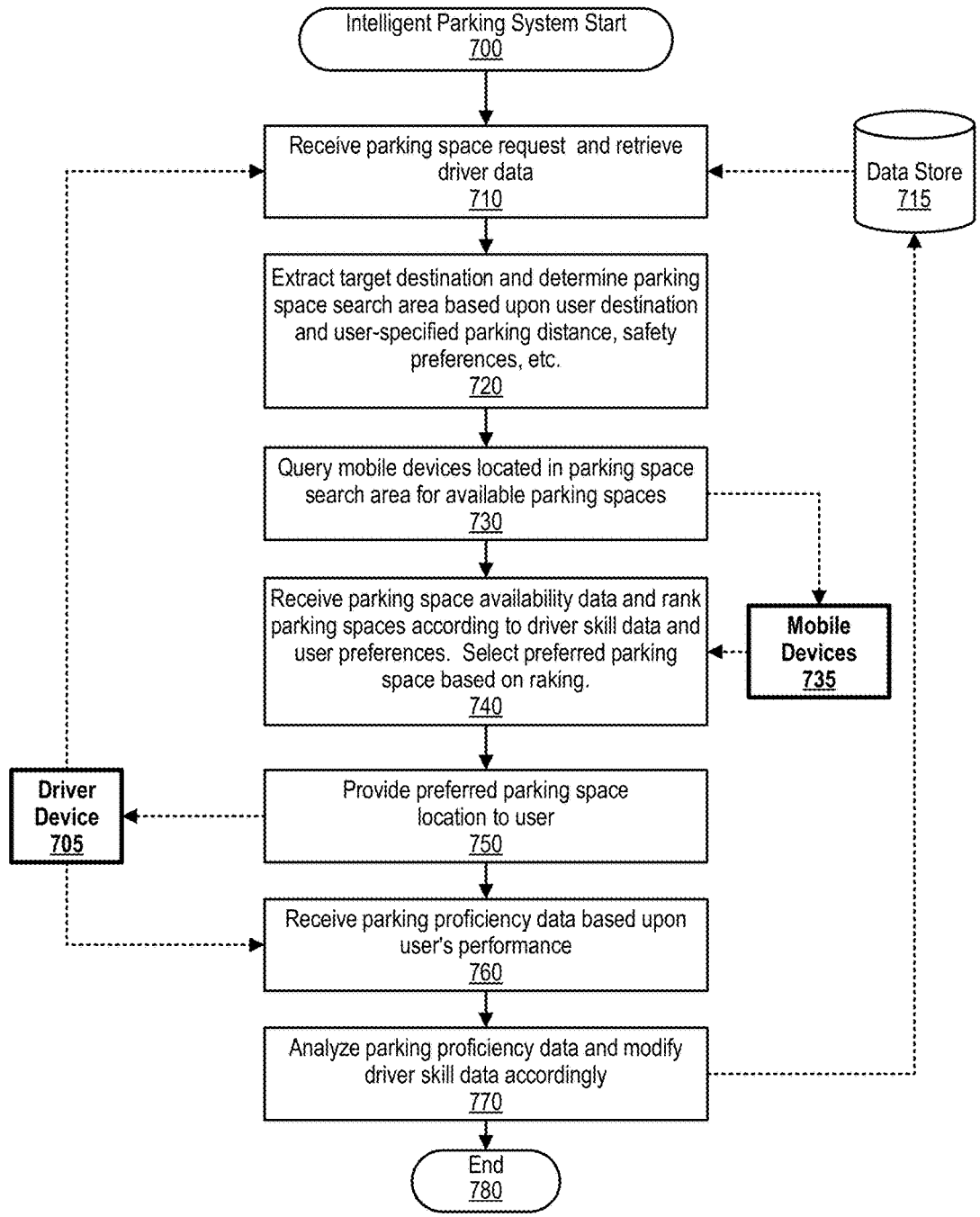
FIG. 7 is an exemplary flowchart depicting steps taken by an intelligent parking system to locate a preferred parking space based upon a driver's data such as driver skill level and parking preferences.

At step 530, the process uploads the driver's driver data onto to intelligent parking system 300, which intelligent parking system 300 utilizes to locate a preferred parking space when requested by driver 520 (see FIGS. 6, 7, and corresponding text for further details). In one embodiment, the driver device stores the driver data in a local storage area to accommodate impromptu requests from intelligent parking system 300, such as when entering an out of state parking garage (see FIG. 6 and corresponding text for further details). Processing ends at 540.

FIG. 6 is an exemplary flowchart depicting steps taken by a driver device to receive available parking space information from intelligent parking system 300. Processing commences at 600, whereupon the process receives a parking space request from driver 520 (driver) and sends a request to intelligent parking system 300 that includes the driver 520's target destination (step 610). In one embodiment, driver 520 manually initiates a request, such as selecting button 830 on driver device 800 (e.g., smart phone, vehicle navigation system, etc.) shown in FIG. 8. In another embodiment, the driver device automatically sends a parking space request when the driver enters a target destination in the driver device. For example, the driver may enter a restaurant address and the driver device is configured to automatically send a parking space request whenever the driver's target destination corresponds to a restaurant or within a city with limited parking capabilities. In yet another embodiment, the driver device may receive a request from intelligent parking system 300 to provide the driver data. For example, a driver may drive a vehicle up to a parking lot entrance that includes intelligent parking system 300. In this example, intelligent parking system 300 may query the driver's device for the driver's data. In turn, intelligent parking system 300 locates a preferred parking space based upon the driver's data, such as the driver's skill level and other parking preferences.

At step 620, the process receives a preferred parking space location (e.g., GPS coordinates) from intelligent parking system 300. At step 630, in one embodiment, the process changes the target destination on the navigation system to the preferred parking space location to direct the driver directly to the preferred parking space instead of the target destination (e.g., restaurant).

The process, at step 640, tracks driver proficiency while the driver is parking the vehicle in the preferred parking space. For example, the process may use sensors on the vehicle to determine a number of entry attempts before parking the vehicle, or whether the vehicle contacted other objects such as adjacent vehicles, poles, etc. At step 650, the process requests feedback from driver 520, such as whether driver 520 would prefer a larger space next time or would prefer an angled parking space. The process, at step 660, sends the parking proficiency data and driver feedback to intelligent parking system 300. In turn, intelligent parking system 300 may modify driver 520's driver data accordingly. For example, driver 520 may have stated that their driving skill level is "expert," yet driver 520 required four attempts to enter the parking space and contacted an adjacent car. In this example, intelligent parking system 300 may re-classify driver 520's driving skill level to "below average" (see FIG. 7 and corresponding text for further details).

FIG. 7 is an exemplary flowchart depicting steps taken by an intelligent parking system to locate a preferred parking space based upon a driver's data such as driver skill level and parking preferences. Processing commences at 700, whereupon the process receives a parking space request from driver device 705 and retrieves driver data corresponding to the driver from data store 715. In one embodiment, driver device 705 provides the driver data to the intelligent parking system with the request.

At step 720, the process extracts a target destination from the request and determines a parking space search area based upon the target destination and parking preferences such as the driver's parking distance threshold, safety preferences, and parking cost preferences. For example, if the target destination is 100 Main Street and the parking distance threshold is 500 feet, the intelligent parking system determines that the parking space search area is within a 500 feet radius of 100 Main Street. In addition, in this example, the intelligent parking system may eliminate parking lots that are higher cost than a parking cost preference indicated by the driver.

At step 730, the process queries other devices located within the parking space search area to gather parking availability data. For example, a driver walking in the parking space search area may be wearing a mobile device and the intelligent parking system sends a request to the mobile device to search for open parking spaces. In another example, vehicles within the parking space search area may be driving by, or parked next to, an available parking space. In this example, upon receiving the request from the intelligent parking system, the vehicles provide parking availability data to the intelligent parking system. In one embodiment, the parking availability data includes dimensions of the parking space and location of the parking space (see FIG. 4 and corresponding text for further details).

At step 740, the process receives parking availability data and ranks the available parking spaces according to driver skill level and parking preferences. For example, as discussed earlier, if the driver prefers an angled parking space, the process applies a higher weighting to angled parking spaces. In another example, the driver may be driving a large vehicle and require additional space to maneuver the vehicle into the parking space. In this example, the process applies a higher weighting to parking spaces that have small vehicles, or no vehicles, in the adjacent parking spots. In addition, the process considers the skill level of the driver (included in driver data 315). For example, if the driver is a highly skilled driver, the process may place a higher weighting over a "tight fitting" parking space close to the target destination over a larger parking space that is further from the target destination.

At step 750, the process provides the preferred parking space location to driver device 705 that, in one embodiment, modifies the driver's target destination to the preferred parking space location (see FIG. 6 and corresponding text for further details). At step 760, the process receives parking proficiency data once the driver parks the vehicle based upon the driver's parking performance, such as the number of times that the driver had to put the vehicle in reverse to accommodate for poor judgment on angle of entry into the parking space. At step 770, the process analyzes the parking proficiency data and modifies the parking preferences and driver skill level accordingly. For example, if the driver parked a vehicle in a small parking space without having to put the vehicle in reverse, the intelligent parking system may increase the driver's skill level to "above average." Processing ends at 780.

Figure 8:
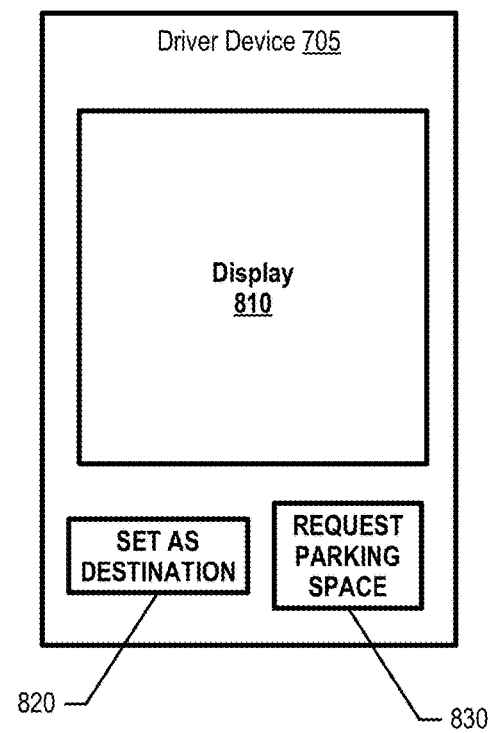
FIG. 8 is an exemplary diagram depicting a driver device that requests a parking space and receives a preferred parking space location based upon driver data.

FIG. 8 is an exemplary diagram depicting a driver device that requests a parking space and receives a preferred parking space location based upon driver data. As discussed earlier, driver device 705 may be a computing device such as a smart phone, laptop, desktop, tablet, onboard vehicle system (e.g., computer system, navigation system), wearable device, or other computing device capable of receiving driver input and providing the driver input to intelligent parking system 300.

A driver enters destination information into driver device 705, such as with a touch screen keyboard depicted on display 810. The driver, in turn, selects button 820 to set the location information as a target destination (e.g., Restaurant ABC). In one embodiment, the driver then selects button 830 to send a request to intelligent parking system 300, which instructs intelligent parking system 300 to search for an available parking space in proximity to the target destination based upon the driver's data discussed herein. In another embodiment, driver device 705 automatically sends a parking space request to intelligent parking system 300 when the driver enters a target destination meeting particular criteria such as a location within the driver's city limits.

In turn, driver device 705 receives a preferred parking space location and, in one embodiment, stores the preferred parking space location as the target destination.

Figure 9:
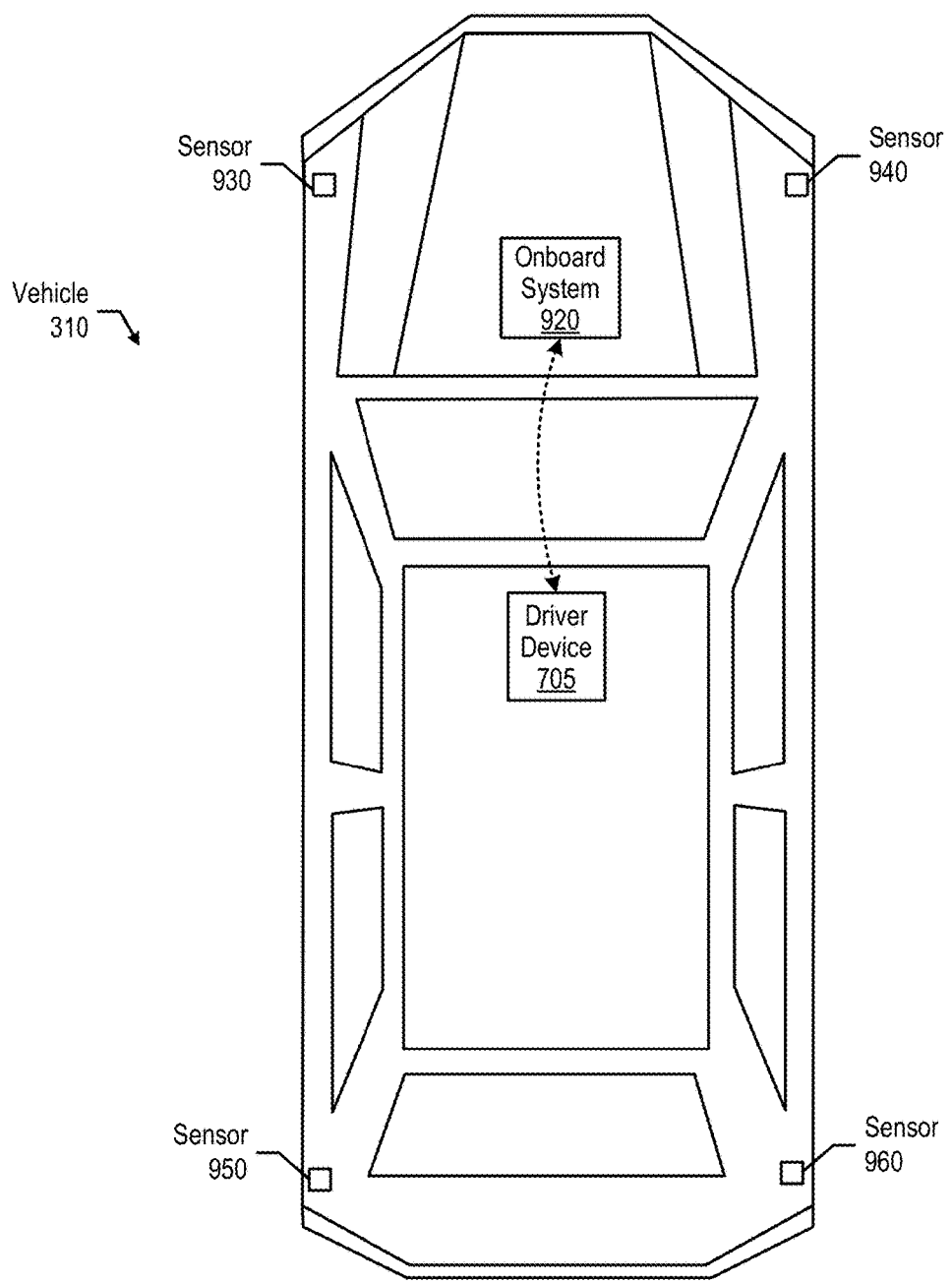
FIG. 9 is an exemplary diagram depicting a vehicle that includes an onboard system and sensors to capture parking space properties of available parking spaces.

FIG. 9 is an exemplary diagram depicting a vehicle that includes an onboard system and sensors to capture parking space properties of available parking spaces. Vehicle 310, in one embodiment, includes onboard system 920 that communicates with driver device 705. Driver device 705 may be a driver's smartphone, an onboard navigation system, or other computing devices discussed earlier.

Onboard system 920 receives information from sensors 930, 940, 950, and 960 corresponding to objects in proximity to vehicle 310. In one embodiment, sensors 930-960 may provide audio data (sonar) to onboard system 920 which allows onboard system 920 to determine a distance between vehicle 310 and proximate objects such as other vehicles, poles, curbs, etc. In another embodiment, sensors 930-960 may provide video data to onboard system 920, which allows onboard system 920 to utilize geometric algorithms to compute distances between vehicle 310 and proximate objects.

Onboard system 920 compiles the collected data and sends parking availability data to intelligent parking system 300, which allows intelligent parking system 300 to determine available parking spaces and their corresponding sizes. For example, when onboard system 920 determines that 15 feet is between two vehicles, onboard system 920 marks the location of the area as an available parking space (assuming no restrictions are apparent such as a fire hydrant).

When the driver is parking vehicle 310, in one embodiment, onboard system 920 interfaces to vehicle 310's steering and drivetrain system to determine a proficiency at which a driver is able to park vehicle 310 in a parking space. For example, onboard system 920 may track the number of steering corrections or the number of times that the driver placed vehicle 310 in reverse to park vehicle 310. In turn, onboard system 920, or driver device 705, sends proficiency data to intelligent parking system 300 to adjust the driver's skill level accordingly. In one embodiment, vehicle 310 has a self-parking option and onboard system 920 determines appropriate steering maneuvers to park vehicle 310 based on parking space dimensions provided by intelligent parking system 300.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
   one or more processors;
   a memory coupled to at least one of the processors;
   a set of computer program instructions stored in the memory and executed by at least one of the processors in order to perform actions of:
      receiving a request corresponding to a driver of a vehicle, the request initiated in response to the driver entering a target destination on a computing device;
      sending a parking space search request to one or more mobile devices in response to receiving the request;
      receiving parking availability data corresponding to a plurality of available parking spaces from the plurality of mobile devices;
      computing, based on the parking availability data, a first parking space size of a first one of the plurality of available parking spaces and a first destination distance from the first available parking space to the target destination;
      computing, based on the parking availability data, a second parking space size of a second one of the plurality of available parking spaces and a second destination distance from the second available parking space to the target destination, wherein the first parking space size is smaller than the second parking space size and the first destination distance is shorter than the second destination distance;
      retrieving a driver skill level of the driver;
      assigning a first weighting to the first available parking space and a second weighting to the second available parking space, wherein the assigning comprises assigning a higher weighting to the first available parking space compared to the second available parking space in response to determining that the driver is assigned a high driver skill level, and assigning a higher weighting to the second available parking space compared to the first available parking space in response to determining that the driver is assigned a low driver skill level;
      selecting a preferred parking space from the first available parking space and the second available parking space based on their corresponding weightings; and
      notifying the driver of the preferred parking space, wherein the notifying results in changing the target destination on the computing device to a location of the preferred parking space.

2. The information handling system of claim 1 wherein at least one of the processors perform additional actions comprising:
   extracting the target destination from the request;
   retrieving a parking distance threshold corresponding to the driver, wherein the parking distance threshold indicates a parking distance from the target destination acceptable by the driver; and
   determining a parking space search area based upon the target destination and the parking distance threshold, wherein the plurality of available parking spaces are identified within the parking space search area.

3. The information handling system of claim 1 wherein at least one of the processors perform additional actions comprising:
   subsequent to notifying the driver of the preferred parking space, receiving parking proficiency data that corresponds to a level at which the driver parked the vehicle in the preferred parking space;
   updating the driver skill level based upon the parking proficiency data;
   receiving feedback from the driver corresponding to the preferred parking space; and
   updating a parking preference of the driver based on the feedback.

4. The information handling system of claim 3 wherein the parking preference is selected from the group consisting of a safety preference and a parking space type preference.

5. A computer program product stored in a non-transitory computer readable storage medium, comprising computer program code that, when executed by an information handling system, causes the information handling system to perform actions comprising:
   receiving a request corresponding to a driver of a vehicle, the request initiated in response to the driver entering a target destination on a computing device;
   sending a parking space search request to one or more mobile devices in response to receiving the request;
   receiving parking availability data corresponding to a plurality of available parking spaces from the plurality of mobile devices;
   computing, based on the parking availability data, a first parking space size of a first one of the plurality of available parking spaces and a first destination distance from the first available parking space to the target destination;
   computing, based on the parking availability data, a second parking space size of a second one of the plurality of available parking spaces and a second destination distance from the second available parking space to the target destination, wherein the first parking space size is smaller than the second parking space size and the first destination distance is shorter than the second destination distance;
   retrieving a driver skill level of the driver;
   assigning a first weighting to the first available parking space and a second weighting to the second available parking space, wherein the assigning comprises assigning a higher weighting to the first available parking space compared to the second available parking space in response to determining that the driver is assigned a high driver skill level, and assigning a higher weighting to the second available parking space compared to the first available parking space in response to determining that the driver is assigned a low driver skill level;
   selecting a preferred parking space from the first available parking space and the second available parking space based on their corresponding weightings; and
   notifying the driver of the preferred parking space, wherein the notifying results in changing the target destination on the computing device to a location of the preferred parking space.

6. The computer program product of claim 5 wherein the information handling system performs further actions comprising:
   extracting the target destination from the request;
   retrieving a parking distance threshold corresponding to the driver, wherein the parking distance threshold indicates a parking distance from the target destination acceptable by the driver; and
   determining a parking space search area based upon the target destination and the parking distance threshold, wherein the plurality of available parking spaces are identified within the parking space search area.

7. The computer program product of claim 5 wherein the information handling system performs further actions comprising:
- subsequent to notifying the driver of the preferred parking space, receiving parking proficiency data that corresponds to a level at which the driver parked the vehicle in the preferred parking space;
- updating the driver skill level based upon the parking proficiency data;
- receiving feedback from the driver corresponding to the preferred parking space; and
- updating a parking preference of the driver based on the feedback.

* * * * *